United States Patent Office 2,795,884
Patented June 18, 1957

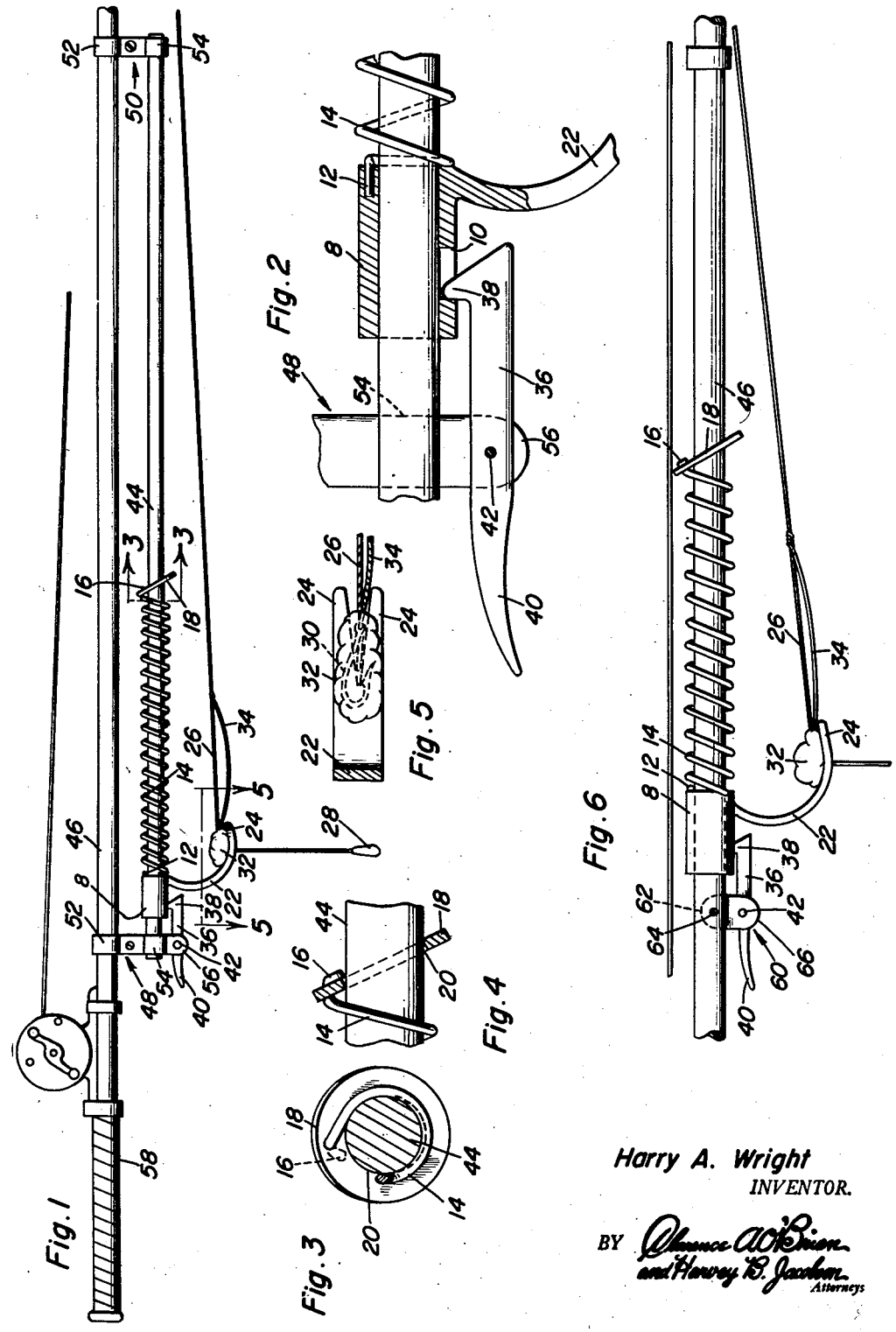
June 18, 1957   H. A. WRIGHT   2,795,884
BAIT CASTING DEVICE
Filed March 7, 1955
Harry A. Wright
INVENTOR.

2,795,884
BAIT CASTING DEVICE
Harry A. Wright, Highland, Ohio
Application March 7, 1955, Serial No. 492,372
1 Claim. (Cl. 43—19)

This invention relates to a manually controlled mechanical fishing line holding and casting device.

There are two embodiments involved, one of which is mounted directly on the conventional type fishing rod. The other embodiment, a so-called attachment type, is bracketed on the rod.

The primary object of the invention is to provide a simple, practical and reliable casting or catapulting device which is characterized by a spring projected slidably mounted collar, a spring anchoring and tension adjusting member, and a handily arranged pivotally mounted trigger latch releasably engaged with the collar, and means carried by and depending from the collar for releasably holding the baited hook and line, said means serving to effectuate the desired cast.

Other objects, features and advantages will become more readily apparent from the following description and the accompanying drawing.

In the drawings:

Figure 1 is a side elevation of a conventional type fishing rod showing the aforementioned attachment type bait casting device mounted thereon;

Figure 2 is an enlarged fragmentary view of certain essential elements of the device;

Figure 3 is an enlarged section on the line 3—3 of Figure 1;

Figure 4 is a view of Figure 3 in a direction from right to left with the washer appearing in section;

Figure 5 is an enlarged section on the line 5—5 of Figure 1; and

Figure 6 is a fragmentary side elevational view showing a modification wherein the device is mounted directly on the fishing rod.

The essential parts of both embodiments of the invention (Figures 1 to 5, inclusive, and Figure 6) are the same. Therefore, they are identified by like numerals. To this end, the device comprises a cylindrical sleeve or collar 8 having an opening in its bottom (Figure 2) which is herein denoted as a keeper hole 10. One end portion 12 of a coiled compression spring 14 is fixed to the cooperating end of the collar. The other end portion 16 of the spring (Figures 3 and 4) is similarly fixed to a canted washer 18. This is a so-called friction clutch washer having a hole 20 sufficiently large to permit the washer to assume the oblique angled position illustrated. This washer is obviously for anchoring the cooperating end of the spring and also permitting this end portion to be extended or retracted and to thus adjust the tension of the spring to the desired degree, making it possible to effectually regulate the nature of the cast which is to be made. The holder and casting member is a simple curvate finger 22. This is integral with and depends below the bottom of the collar and has a forked free end, the prongs of the fork being denoted at 24 in Figure 5. This construction is thus adapted to accommodate the cooperating portion of the fishing line 26 in a manner to suspend the sinker 28 and to accommodate the hook 30 and bait 32 carried by the leader 34. The forked finger is thus in effect a holding and catapulting hook for the baited fishing line, as is obvious. In both forms of the invention, there is a trigger latch 36 having a detent 38 releasably engageable with the keeper seat, as brought out in Figure 2. The trigger or trip portion of the latch is denoted at 40. The latch is pivotally mounted intermediate its ends, as at 42.

In the form of the invention seen in Figure 1, the attachment type, there is an adapter rod 44. This is disposed in spaced parallelism beneath the conventional fishing rod 46. Similar brackets 48 and 50 are provided, and these have portions 52 embracing and fastened to the fishing rod, and similar portions 54 embracing and fastened to the adapter rod 44. The bracket 48 has depending spaced parallel ears 56 and the intermediate portion of the trigger latch is pivoted between these ears so that the latch is left in a position to releasably engage the detent 38 with the keeper hole 10 in the manner illustrated in Figure 2.

In practice, the canted washer 18 is adjusted to the desired position on the rod 44 to regulate the intended tension of the coil spring. The spring is stretched in a direction from right to left, and the detent is engaged with the keeper seat in the manner shown. What with the fact that the bracket 48 is handily close to the handle 58, the trip or trigger 40 may be readily grasped and released to permit the coil spring to come into play with the result that the motive force engendered will effectuate the cast of the baited line in an obvious manner.

In the form of the invention in Figure 6, instead of applying the device indirectly as an attachment to the fishing rod, the device itself is mounted directly on the fishing rod. That is to say, coil spring 14 encircles the rod 46 and the canted washer is adjustably anchored thereon in the manner shown. This means, of course, that the brackets 48 and 50 and adapter rod 44 are dispensed with. In fact, there is a single bracket employed, and this is denoted at 60. It has a lug 62 mounted in a recess provided therefor in the rod and secured in place, as at 64. The depending ears 66 provide the mount for the pivot 42 and trigger latch. The operation is the same as that already covered.

Since numerous modifications and changes will readily occur to those skilled in the art, it is not desired to limit the invention to the exact construction and operation shown and described, and accordingly, all suitable modifications and equivalents may be resorted to, falling within the scope of the appended claim.

What is claimed as new is as follows:

In combination, a reel-equipped fishing rod, an adapter rod, brackets secured to the respective end portions of said adapter rod and also to cooperating portions of said fishing rod at longitudinally spaced places and thus securing said adapter rod to the fishing rod in spaced parallelism, a collar slidably mounted on said adapter rod adjacent one of said brackets, said collar having a keeper hole formed therein, a curvate finger fixed to and projecting laterally from said collar, said finger providing a temporary holder for the baited hook and complemental fishing line, a coil spring encircling said rod and having one end secured to said collar, an oblique angled washer secured to the other end of said spring and adjustably mounted on said adapter rod in a manner to tension and anchor said spring on said adapter rod, and a trigger latch pivotally mounted intermediate its ends on the bracket which is adjacent to said collar and having a finger trip at one end and a lateral detent at the other end releasably engageable with said keeper hole.

References Cited in the file of this patent

UNITED STATES PATENTS

| | | |
|---|---|---|
| 2,216,341 | Hagen | Oct. 1, 1940 |
| 2,584,678 | Dewey | Feb. 5, 1952 |
| 2,705,383 | Hatcher | Apr. 5, 1955 |
| 2,740,219 | Harden | Apr. 3, 1956 |

FOREIGN PATENTS

| | | |
|---|---|---|
| 171,951 | Austria | July 25, 1952 |
| 881,119 | France | Apr. 5, 1943 |